3,051,699
NITROGENATED GRANULAR STARCH
PRODUCTS
Lee H. Elizer, Glen C. Glasscock, and John M. Seitz, Keokuk, Iowa, assignors to The Hubinger Company, Keokuk, Iowa, a corporation of Iowa
No Drawing. Filed Jan. 15, 1959, Ser. No. 786,927
4 Claims. (Cl. 260—233.3)

This invention relates to new substituted starch products and to processes for making them.

This application is a continuation-in-part of Elizer et al. application, Serial Number 729,229, filed April 18, 1958, now abandoned.

The object of this invention is the preparation of granular cationic, nitrogen-containing starch products.

Another object is to provide new methods for making said cationic, nitrogenated starch products.

Still another object is to provide new substituted starch products possessing important advantages such as reduced gelatinization temperature, increased viscosity, retention of paste fluidity after cooling and standing, and improved affinity for negatively charged materials, as, for example, cellulose.

Other objects and advantages will become obvious from the following description.

We have discovered that when starch is treated in aqueous slurry with an aqueous alkaline solution of cyanamide containing an alkali metal or alkaline earth metal base, or with an aqueous alkaline solution of an alkali metal or alkaline earth metal cyanamide, it reacts under certain conditions to form new cationic nitrogenated products. These nitrogenated products, when treated with an acid, form stable cationic acid salts.

It will be understood that both in the specification and claims, the alkali metal or alkaline earth metal cyanamides include both the completely metallated cyanamide, such as CaNCN or $Na_2NCN$, or the partially metallated cyanamides, such as $Ca(HNCN)_2$ or NaHNCN.

The conditions which we have found essential to obtain the desired reaction include the following: The solvent medium must be aqueous. Alkalinity of the reaction mixture must be at least pH 8.5 and preferably at least about pH 10 or 10.5 up to about 11.5 to 12 or higher. Above pH 12 the starch shows some tendency to gelatinize but this can be avoided by use of a gelatinization inhibitor.

Reaction of the granular starch with the cyanamide occurs at any temperature up to the gelatinization point of the starch, namely from below the freezing point of the reaction mixture up to temperatures of about 135° F.

Other conditions such as the ratio of cyanamide to starch, the concentration of the cyanamide dissolved in the aqueous reaction mixture, or the time of reaction are not critical, although they do influence the extent of nitrogen substitution in the starch molecule. For example, higher ratios of total cyanamide to the starch tends to increase the degree of substitution.

The precise nature of the reaction mechanism or of the substituent nitrogen-containing radicals is not yet completely understood. It is likely that the reactive hydroxyl groups of the starch molecule participate in the reaction. It is interesting to note that compounds such as the dialkyl cyanamides, dicyandiamide, urea and thiourea will not react with the starch under the conditions of our process. When an alkali metal or alkaline earth metal cyanamide is dissolved in water or when cyanamide is dissolved in an alkaline solution of an alkali metal or an alkaline earth metal base, the $(HNCN)^-$ ion is formed, as, for example:

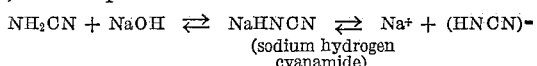
(sodium hydrogen cyanamide)

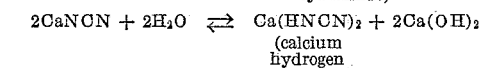
(calcium hydrogen cyanamide)

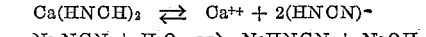

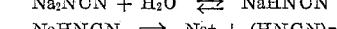

We consider it probable that the $(HNCN)^-$ ion is the reactive agent. It will be understood, however, that the invention is not to be restricted by the foregoing hypothesis.

As aforementioned, the nitrogen-containing reagent must be cyanamide dissolved in an aqueous solution of an alkali metal or alkaline earth metal base, such as sodium, potassium, lithium, calcium, barium or strontium hydroxide, or an aqueous solution of an alkali metal or alkaline earth metal cyanamide, such as sodium, potassium or calcium cyanamide, the solutions having a minimum pH of about 8.5 and preferably about 10.0. It is ordinarily not necessary to add a base to a solution of the cyanamide salt to produce the required alkalinity since solutions of such salts in water generally are sufficiently alkaline. An aqueous solution of calcium cyanamide, for example, generally has a pH in the range of about 10.5 to 11.9. An alkali metal or alkaline earth metal cyanamide hydrolyzes in water to form a solution which is substantially similar to an aqueous solution of cyanamide in an alkaline solution of an alkali metal or alkaline earth metal base. In general, we prefer to employ calcium cyanamide because of its availability, low cost and high efficiency.

The starch employed in the reaction can be of substantially any type including the so-called thin-boil starches which have been moderately hydrolyzed to reduce their viscosity. The starch can be from various sources such as corn starch, wheat starch, potato starch, tapioca and the like.

The starch-alkaline cyanamide reaction mixture can be prepared in various ways. An aqueous alkaline cyanamide solution can be separately prepared and added to an aqueous starch slurry; the alkaline cyanamide salt or cyanamide and alkaline base can be dissolved directly in the aqueous starch slurry; or the starch can be directly slurried in an aqueous alkaline solution of the cyanamide.

The reaction mixture is then maintained at the desired reaction temperature, the maximum preferably being about 135° F., and preferably 75° to 120° F., for a sufficient length of time to obtain the desired degree of nitrogen substitution. We have found that the degree of substitution tends to increase with reaction time and generally reaches a maximum in about 6 to 16 hours. Reaction can be continued beyond this time, but normally provides no economic advantage. In some cases, there may even be some small loss of substituted nitrogen with prolonged treatment beyond about 16 hours although a cationic, nitrogenated product is still obtained.

It has been noted that substitution rate is somewhat greater at the higher temperatures. For example, a given degree of substitution can be achieved in about 4 hours at 120° F., whereas it requires about 6 to 7 hours at 100° F. In general no appreciable substitution occurs within less than about ½ to 1 hour.

The minimum substitution to produce a desirable product is about 0.75 mole $N_2$ per 100 anhydroglucopyranose units (AGU), preferably about 1.4 moles $N_2/100$ AGU. Nitrogen substitution can be increased as much as desired, although some processing difficulties may be experienced at substitutions above about 6 to 8 moles $N_2/100$ AGU because of thickening of the reaction mixture.

The nitrogenated granular starch products can be separated from the alkaline reaction mixture, washed and dried. Since they do not gelatinize readily, they are preferably employed as dry starches, as, for example, in dusting powders and the like. They are particularly useful as intermediates in the preparation of other starch derivatives, particularly the cationic acid salts.

The acid salt derivatives can be prepared from the washed and dried parent nitrogenated starch compounds by reslurrying in water and acidifying. They are most conveniently prepared by acidification of the alkaline starch-cyanamide aqueous reaction slurry with the particular acid, the derivative of which is desired, to a pH less than 4, preferably about 2.5 to 2 or less. In some cases, it may be desirable to reduce to a pH of about 1. The pH can be even lower but this ordinarily provides no economic advantage because of waste of excess acid.

Substantially any acid can be used including inorganic and organic acids, such as hydrochloric, nitric, sulfuric, sulfurous, phosphoric, acetic, propionic acids and the like. In general, we prefer to employ hydrochloric, nitric or sulfuric acid.

The acidification treatment can be carried out at ordinary or elevated temperatures, as, for example, the temperature of the initial nitrogenation reaction. Preferably, the temperature is not raised above 135° F., preferably 120° F.

After the acid treatment is completed, it is desirable to remove excess acid before drying the nitrogenated starch acid salts to prevent acid modification of the starch under the elevated temperature conditions of the drying procedure. This can be accomplished by washing but is more conveniently achieved by neutralizing with any suitable alkaline reagent, such as sodium, potassium or calcium hydroxide, sodium carbonate or bicarbonate or the like to a pH of at least about 4.0 and up to about 6, preferably about 4.5 to 5.0. The nitrogenated starch acid salt derivatives can then be separated from the reaction slurry, washed and dried in any conventional manner.

The acid salts vary in their properties according to the particular acid employed. Some derivatives, such as the phosphate, the sulfite and the acetate salts, like the parent compounds, do not readily gelatinize and are, therefore, most useful where a dry starch is desirable as, for example, in dusting powders, since, when wetted, they do not swell and become gummy or slick.

Some of the salts, such as the hydrochloride, the nitrate and the sulfate, are paste-forming and possess the marked advantages, as compared with the untreated starch, of considerably reduced gelatinization temperature, which increases substantially ease of cooking; greatly reduced set-back, so that, unlike the untreated starch, the gel remains fluid after cooling and standing; and of being cationic, so that, unlike the negative untreated starch paste, the modified starch derivatives possess a particular affinity for negatively charged materials such as cellulose. Our modified starch pastes are also generally characterized by substantially higher viscosity than the untreated starch pastes. A particular advantage of our invention stems from the fact that modified starch products for specific applications can be tailored by such means as varying the degree of nitrogen substitution, the particular acid employed in forming the acid salt derivative, the particular starch employed as raw material, and the like.

The cationic paste-forming, nitrogenated starch acid salts are useful wherever conventional starch pastes are employed and particularly in textile printing gums and warp sizing, as a beater additive and in coatings in paper making, in adhesives, as a salad dressing base, in ore beneficiation and water purification and the like.

EXAMPLE 1

A solution of cyanamide was prepared by slurrying 1,000 grams of powdered crude calcium cyanamide in 10 liters of water at 78° F. for 30 minutes, filtering, and washing the filter cake with 1 liter of water, which was added to the filtrate. The pH of the filtrate was reduced to 5.0 with cool 20% sulfuric acid and the precipitated calcium sulfate filtered off. By Kjeldahl analysis, 1,000 mls.=0.313 mole cyanamide.

5 moles (5 AGU, 900 grams) regular unmodified granular corn starch were slurried in 1 liter of the cyanamide solution. The pH was raised to pH 10.5. After 16 hours of reaction time at 78° F., the slurry was filtered, washed, and dried to a moisture content of 10.3%. Nitrogen content of the product, dry basis, was 0.39% or 2.2 moles $N_2/100$ AGU. The product did not gelatinize at temperatures up to 92° C. in aqueous suspension.

EXAMPLE 2

The product was prepared in the same way as that in Example 1 except that sodium hydroxide was used to raise the pH of the reaction slurry to 10.5.

The product was dried to a moisture content of 10.6%. Nitrogen content, dry basis, was 0.36% or 2.1 moles $N_2/100$ AGU. It did not gelatinize at temperatures up to 92° C. in aqueous suspension.

EXAMPLE 3

The products characterized in Table I were prepared by slurrying 5 moles (5 AGU) of regular unmodified granular corn starch in 1 liter of an aqueous cyanamide solution prepared as disclosed in Example 1; raising the pH of the aqueous slurry to about pH 10.5 with various alkali metal and alkaline earth metal hydroxides, as shown, except for product A which was treated with the stock cyanamide solution at pH 5; permitting the slurry to react for 16 hours at 78° F.; reducing pH of the slurry to 2 with various acids, as shown; raising the pH to 5.0 after 1 hour of the acid treatment with sodium carbonate; filtering; washing the product; and drying.

Alkaline fluidity of the product was determined by standard procedure in which 2 grams of the starch product were slurried in 10 cc. distilled water and then combined with 90 cc. 1% NaOH. The mixture was refrigerated at 40° F. for ½ hour, stirred, and poured into a funnel with a standard tip. Alkaline fluidity is given as the number of cubic centimeters flowing out through the funnel tip in 1 minute.

The products were also tested on a standard Corn Industry Viscosimeter (CIV) to determine the initial temperature of gelatinization, the temperature at peak viscosity, the peak viscosity, and the viscosity 20 minutes after the paste reached peak viscosity. Set-back of the paste was checked after 24 hours of standing at 78° F. to determine whether the paste was still fluid or had set into a stiff gel. The pH of the starch dispersion was determined by glass electrode both before and after cooking on the CIV.

Cationicity was determined by electrolysis of a cooked aqueous 2% starch product dispersion. Products G and I were not thus tested.

Table I

| Product | A | B | C | D | E | F | G | H | I |
|---|---|---|---|---|---|---|---|---|---|
| Base to raise pH | None | Ba(OH)$_2$ | Ca(OH)$_2$ | NaOH | LiOH | KOH | KOH | Sr(OH)$_2$ | Sr(OH)$_2$. |
| Acid to lower pH | HCl | HCl | HCl | HCl | HCl | HCl | Acetic | HCl | H$_2$SO$_4$. |
| H$_2$O, percent | 10.0 | 10.5 | 10.7 | 11.1 | 11.2 | 10.5 | 9.9 | 10.3 | 9.9. |
| Nitrogen, percent D.B.[1] | 0.07 | 0.30 | 0.39 | 0.36 | 0.29 | 0.29 | 0.31 | 0.34 | 0.36. |
| Alkaline fluidity, 2 grams | 41 | 26.0 | 20.0 | 22.5 | 21.0 | 21.0 | 17 | 21 | 14. |
| CIV, percent starch in slurry D.B. | 4.9 | 3.0 | 3.0 | 3.0 | 3.0 | 3.0 | 3.0 | 3.0 | 3.0. |
| Initial temp. of gelatinization, °C | 87.0 | 76.0 | 72.0 | 73 | 78.0 | 76.0 | >92 | 76.5 | >92. |
| Temp. at peak viscosity | 90.0 | 84.0 | 78.0 | 81 | 84.5 | 82.5 | | 83.0 | |
| Peak viscosity | 155 | 370 | 860 | 800 | 380 | 580 | | 480 | |
| Viscosity after 20 minutes | 155 | 175 | 380 | 370 | 180 | 300 | | 200 | |
| Paste after 24 hours | Stiff gel | Fluid | Fluid | Fluid | Fluid | Fluid | | Fluid | |
| pH, slurry/paste | 3.9/5.5 | 3.7/5.9 | 3.5/5.8 | 3.5/5.8 | 3.7/5.8 | 3.8/6.3 | 4.9 | 3.8/6.3 | 4.3. |
| Moles N$_2$/100 AGU glucose, units added | 0.0 | 1.7 | 2.2 | 2.1 | 1.7 | 1.7 | 1.7 | 2.0 | 2.1. |
| Cationicity | − | + | + | + | + | + | | + | |

[1] Dry basis.

It will be noted from the data given in Table I that product A, which was treated with an aqueous cyanamide solution at pH 5, did not react to form a nitrogenated product, had a substantially higher initial temperature of gelatinization and temperature at peak viscosity and a considerably lower paste viscosity than the various nitrogenated starch hydrochlorides. The paste made with product A was anionic and set to a stiff gel upon standing, whereas the nitrogenated hydrochlorides were cationic and retained paste fluidity after standing for 24 hours.

EXAMPLE 4

The following reactions illustrate the use of the sodium salt of cyanamide as the treating reagent.

The sodium cyanamide salt (sodium hydrogen cyanamide—NaHNCN) was prepared by slurrying crude CaCN$_2$ in 5,000 ml. H$_2$O for 30 minutes at 78° F. Sodium carbonate was then added in 1000 ml. H$_2$O in sufficient amount to precipitate the calcium. The slurry was filtered and the filter cake washed with 1,000 ml. H$_2$O. The filtrate was combined with the washings and the pH adjusted to 11.0 with HCl.

The starch employed was a 48 alkaline fluidity thinboil. 4,500 grams of starch were slurried in water and treated with the sodium cyanamide salt for about 16 hours at 78° F. The pH was reduced to 2.0 with HCl for 1 hour, raised to pH 5.0, filtered, washed and dried.

Product 48.00 is the thinboil starch untreated. The treated products are as follows:

| Product | Percent crude CaCN$_2$ on starch employed to produce sodium salt |
|---|---|
| 48.20 | 20 |
| 48.10 | 10 |
| 48.05 | 5 |
| 48.03 | 3 |

The charge of the product was determined by electrolysis. In addition cationicity was tested by determining the number of mls. of 0.5% starch product solution retained completely by 100 mls. of a 1% dispersion of Solkafloc fibers (a highly purified cellulose) after 5 minutes of stirring. Iodine was added to the starch-Solkafloc dispersions. A colorless filtrate indicated complete removal of the starch product by the cellulose fibers.

Table II

| Product | 48.00 | 48.20 | 48.10 | 48.05 | 48.03 |
|---|---|---|---|---|---|
| Reaction data: | | | | | |
| Grams crude CaCN$_2$ | | 810.0 | 405.0 | 202.5 | 121.5 |
| Grams soda ash | | 690.0 | 345.0 | 172.0 | 103.0 |
| Moles sodium cyanamide salt in filtrate | | 3.87 | 1.75 | 1.17 | 0.72 |
| Unreacted slurry pH | | 10.7 | 10.4 | 10.2 | 10.1 |
| Product data: | | | | | |
| Moisture, percent | 10.5 | 9.8 | 11.1 | 9.6 | 10.1 |
| Nitrogen, percent dry basis | 0.07 | 0.69 | 0.48 | 0.35 | 0.19 |
| Moles N$_2$/100 AGU added | 0.0 | 4.0 | 2.8 | 2.0 | 1.1 |
| Alkaline fluidity—5 grams | 48.0 | 37.0 | 34.0 | 45.0 | 45.0 |
| CIV, percent starch dry | 8.0 | 8.0 | 8.0 | 8.0 | 8.0 |
| Initial temp. of gelatinization, °C | 79.0 | 62.0 | 65.0 | 67.0 | 72.0 |
| Temp. at peak viscosity, °C | 86.0 | 69.5 | 72.0 | 73.5 | 79.5 |
| Peak viscosity, gm.-cm. | 95 | 990 | 720 | 1080 | 260 |
| Viscosity after 20 min., gm.-cm. | 35 | 80 | 80 | 130 | 0 |
| Slurry pH | 4.8 | 3.8 | 4.2 | 4.0 | 3.9 |
| Paste pH | 5.4 | 6.2 | 6.5 | 6.6 | 5.0 |
| Paste after 24 hours | (1) | (2) | (3) | (3) | (3) |
| Cationic test—electrolysis | − | + | + | + | + |
| Ml. 0.5% product retained by 100 ml. 1% Solka-Floc after 5 min. stirring | 0.0 | 5.5 | 4.5 | 3.0 | 1.5 |

[1] Stiff gel.  [2] Elastic gel.  [3] Fluid.

It will be noted from the data in Table II that the higher the ratio of the cyanamide compound to the untreated starch, the greater the degree of nitrogen substitution. In general, the greater the degree of nitrogen substitution, the lower the gelatinization temperature. Even with a nitrogen substitution as low as 1.1 moles/100 AGU, gelatinization temperature and set-back were reduced.

EXAMPLE 5

The procedure here was identical with that of Example 4 except that sulfuric acid was employed instead of hydrochloric acid for acidification, thereby forming the sulfate rather than the hydrochloride salt.

Table III summarizes both the reaction and product data.

Table III

| Product | 48.20 | 48.10 | 48.05 | 48.03 |
|---|---|---|---|---|
| Reaction data: | | | | |
| Grams crude CaCN$_2$ | 810.0 | 405.0 | 202.5 | 121.5 |
| Grams soda ash | 690.0 | 345.0 | 171.0 | 103.0 |
| Moles sodium cyanamide salt in filtrate | 5.75 | 2.89 | 1.69 | 1.06 |
| Untreated slurry pH | 11.1 | 10.7 | 10.4 | 10.5 |
| Product data: | | | | |
| Moisture, percent | 9.7 | 10.8 | 10.2 | 11.0 |
| Nitrogen, percent dry basis | 1.05 | 0.71 | 0.46 | 0.36 |
| Moles N$_2$/100 AGU added | 6.1 | 4.1 | 2.7 | 2.1 |
| Alkaline fluidity—5 grams | 29.5 | 43.5 | 43.5 | 45.0 |
| CIV, percent starch dry substance | 8.0 | 8.0 | 8.0 | 8.0 |
| Initial gelatinization temp., °C | 63.0 | 65.0 | 67.0 | 69.0 |
| Temp. at peak viscosity, °C | 66.0 | 67.5 | 70.5 | 73.5 |
| Peak viscosity, gm.-cm | 1,290 | 520 | 560 | 500 |
| Viscosity after 20 min., gm.-cm | 120 | 0 | 15 | 10 |
| Slurry pH | 3.7 | 4.2 | 3.7 | 3.9 |
| Paste pH | 6.1 | 5.9 | 6.1 | 6.1 |
| Paste after 24 hours | (¹) | (¹) | (²) | (²) |
| Cationic test—Electrolysis | + | + | + | + |
| Ml. 0.5% product retained by 100 ml. 1% Solka-Floc after 5 min. stirring | 7.0 | 7.0 | 7.0 | 7.0 |

¹ Elastic gel. ² Fluid.

As aforementioned, we prefer to use calcium cyanamide because of its low cost, ready availability, and high efficiency. The crude, powdered calcium cyanamide can be introduced directly into the aqueous starch reaction slurry if the color of the substituted starch is of no concern. The starch product formed in this manner is generally of a grayish color because of impurities in the crude CaCN$_2$.

It is generally preferable to extract the crude CaCN$_2$ with water and then to employ the filtrate containing the calcium salt of cyanamide since this procedure results in a white starch product. Good extraction of the cyanamide salt is obtained by slurrying 1 part CaCN$_2$ with about 5 to 40 parts of water at 100° F. for about 10 to 60 minutes. The filtrate generally has a pH of about 10.5 to 11.9 and contains about 60 to 100% of the cyanamide from the filter cake by Kjeldahl analysis.

The filtrate can be adjusted both in amount and concentration to provide the desired cyanamide dilution and ratio to the slurried starch. With ratios of 2 to 30 mole equivalents of the calcium cyanamide salt per 100 AGU of starch, we have obtained products analyzing from 0.5 to 8 moles N$_2$/100 AGU before producing substantial gelatinization of the starch granules in the reaction slurry. At a substitution of 8 moles N$_2$/100 AGU, the temperature of gelatinization is about 110° F. Higher substitutions can be obtained by maintaining the reaction slurry at lower temperatures within the reaction range.

EXAMPLE 6

In the work reported in Tables IV and V below, unmodified granular corn starches having alkaline fluidities of 1.0 and 5.0 and granular thinboil starches having alkaline fluidities of 48.00 and 88.0 were treated with aqueous extracts of different weight proportions of crude, unoiled, powdered calcium cyanamide to the starch, dry basis, namely 20% CaCN$_2$ (products 1.20, 5.20, 48.20, 88.20), 10% CaCN$_2$ (products 1.10, 5.10, 48.10, 88.10), 5% CaCN$_2$ (products 1.05, 5.05, 48.05, 88.05), and 3% CaCN$_2$ (products 1.03, 5.03, 48.03, 88.03).

The crude calcium cyanamide was slurried in each instance in 5,000 mls. water at room temperature and then filtered. 4,050 grams of the starch, dry basis (25 moles AGU), were slurried in the cyanamide solution. After 16 hours of reaction time at room temperature, approximately 78° F., the pH of the reaction slurry was reduced to 2.0 with HCl for about 1 hour and then adjusted to 5.0 with sodium carbonate. The starch product was filtered, washed and dried.

Data given for starch products 1.00, 5.00, 48.00, and 88.00 are for the untreated starch.

Table IV

| Product | 1.00 | 1.20 | 1.10 | 1.05 | 1.03 |
|---|---|---|---|---|---|
| Reaction data: | | | | | |
| Mls. water | 0.0 | 5,000 | 5,000 | 5,000 | 5,000 |
| Grams crude CaCN$_2$ | 0.0 | 810 | 405 | 202.5 | 121.5 |
| Mls. filtrate | 0.0 | 4,735 | 4,790 | 4,930 | 4,920 |
| Moles CaCN$_2$ extracted | 0.0 | 5.05 | 2.58 | 1.46 | 0.97 |
| Moles CaCN$_2$ in crude CaCN$_2$ | 0.0 | 6.5 | 3.25 | 1.62 | 0.97 |
| Extraction efficiency, percent | 0.0 | 78.0 | 79.5 | 90.5 | 100.0 |
| Grams dry starch | 0.0 | 4,050 | 4,050 | 4,050 | 4,050 |
| pH slurry | 0.0 | 11.3 | 11.1 | 10.8 | 10.8 |
| Product data: | | | | | |
| Moisture, percent | 10.2 | 10.4 | 11.2 | 12.1 | 10.2 |
| Nitrogen, percent dry basis | 0.06 | 1.07 | 0.70 | 0.47 | 0.31 |
| Moles N$_2$/100 AGU | ¹0.3 | 6.2 | 4.1 | 2.7 | 1.8 |
| CIV, percent starch dry | 5.0 | 1.5 | 2.0 | 3.0 | 5.0 |
| Initial temp. of geletinization °C | 87.0 | 56.0 | 63.0 | 68.0 | 70.0 |
| Temp. at peak viscosity | 90.0 | 60.0 | 67.0 | 72.0 | 75.0 |
| Peak viscosity, gm.-cm | 160 | 960 | 1,020 | 1,050 | 1,350 |
| Viscosity after 20 minutes | 160 | 105 | 125 | 125 | 720 |
| pH slurry/paste | 4.8/5.4 | 3.8/6.1 | 3.9/5.8 | 3.7/6.1 | 3.7/5.9 |
| Paste after 24 hours at 78° F | (²) | (³) | (³) | (³) | (³) |
| Percent CaCN$_2$ in slurry that combines with starch | 0.0 | 30.4 | 39.7 | 46.2 | 46.4 |
| Mls. 0.5% starch solution retained completely by 100 mls. 1% Solkafloc after mixing 5 min | 0.0 | 12.0 | 8.0 | 6.5 | 4.0 |
| Percent CaCN$_2$ combined with starch | 0.0 | 23.8 | 31.5 | 41.6 | 46.4 |

| Product | 5.00 | 5.20 | 5.10 | 5.05 | 5.03 |
|---|---|---|---|---|---|
| Reaction data: | | | | | |
| Mls. water | 0.0 | 5,000 | 5,000 | 5,000 | 5,000 |
| Grams crude CaCN$_2$ | 0.0 | 810 | 405 | 202.5 | 121.5 |
| Mls. filtrate | 0.0 | 4,775 | 4,810 | 4,960 | 4,740 |
| Moles CaCN$_2$ extracted | 0.0 | 5.07 | 2.61 | 1.46 | 0.95 |
| Moles CaCN$_2$ in crude CaCN$_2$ | 0.0 | 6.5 | 3.25 | 1.62 | 0.97 |
| Extraction efficiency, percent | 0.0 | 78.0 | 80.5 | 90.5 | 99.0 |
| Grams dry starch | 0.0 | 4,050 | 4,050 | 4,050 | 4,050 |
| pH slurry | 0.0 | 11.4 | 11.0 | 10.7 | 10.9 |
| Product data: | | | | | |
| Moisture, percent | 10.7 | 11.5 | 11.2 | 10.3 | 10.7 |
| Nitrogen, percent dry basis | 0.06 | 1.11 | 0.67 | 0.44 | 0.32 |
| Moles N$_2$/100 AGU | ¹0.3 | 6.4 | 3.9 | 2.6 | 1.9 |
| CIV, percent starch dry | 5.0 | 1.5 | 2.0 | 3.0 | 5.0 |
| Initial temp. of gelatinization °C | 87.0 | 59.0 | 66.0 | 73.0 | 70.0 |
| Temp. at peak viscosity | 90.0 | 63.0 | 70.0 | 80.0 | 76.0 |
| Peak viscosity, gm.-cm | 85 | 500 | 690 | 260 | 1,140 |
| Viscosity after 20 minutes | 75 | 60 | 60 | 60 | 310 |
| pH slurry/paste | 6.0/6.3 | 3.7/5.8 | 3.9/5.9 | 4.0/5.8 | 3.8/6.0 |
| Paste after 24 hours at 78° F | (²) | (³) | (³) | (³) | (³) |
| Percent CaCN$_2$ in slurry that combines with starch | 0.0 | 31.6 | 37.3 | 44.5 | 50.0 |
| Mls. 0.5% starch solution retained completely by 100 mls. 1% Solkafloc after mixing 5 min | 0.0 | 10.0 | 7.0 | 5.0 | 4.0 |
| Percent CaCN$_2$ combined with starch | 0.0 | 24.6 | 30.0 | 40.0 | 49.0 |

¹ No nitrogen added.
² Stiff gel.
³ Fluid.

Table V

| Product | 48.00 | 48.20 | 48.10 | 48.05 | 48.03 |
|---|---|---|---|---|---|
| Reaction data: | | | | | |
| Mls. water | 0.0 | 5,000 | 5,000 | 5,000 | 5,000 |
| Grams crude $CaCN_2$ | 0.0 | 810 | 405 | 202.5 | 121.5 |
| Mls. filtrate | 0.0 | 4,560 | 4,740 | 4,860 | 4,910 |
| Moles $CaCN_2$ extracted | 0.0 | 4.7 | 2.48 | 1.38 | 0.87 |
| Moles $CaCN_2$ in crude $CaCN_2$ | 0.0 | 6.5 | 3.25 | 1.62 | 0.97 |
| Extraction efficiency, percent | 0.0 | 72.4 | 76.4 | 85.2 | 89.6 |
| Grams dry starch | 0.0 | 4,050 | 4,050 | 4,050 | 4,050 |
| pH slurry | 0.0 | 11.6 | 10.8 | 10.7 | 10.6 |
| Product data: | | | | | |
| Moisture, percent | 10.5 | 9.6 | 10.1 | 10.7 | 12.1 |
| Nitrogen, percent dry basis | 0.07 | 0.97 | 0.62 | 0.38 | 0.26 |
| Moles $N_2$/100 AGU | [1]0.4 | 5.6 | 3.6 | 2.2 | 1.5 |
| Alkaline fluidity | 48.0 | 38.0 | 41.5 | 45.0 | 48.0 |
| CIV, percent starch dry | 8.0 | 8.0 | 8.0 | 8.0 | 8.0 |
| Initial temp. of gelatinization °C | 79.0 | 52.0 | 59.0 | 66.0 | 70.0 |
| Temp. at peak viscosity | 86.0 | 58.0 | 66.0 | 71.0 | 76.0 |
| Peak viscosity gm.-cm | 95 | 1,040 | 840 | 1,020 | 500 |
| Viscosity after 20 minutes | 35 | 85 | 45 | 25 | 55 |
| pH slurry/paste | 4.8/5.4 | 3.6/6.1 | 3.7/6.1 | 3.8/6.1 | 4.1/6.7 |
| Paste after 24 hours at 78° F | [2] | [3] | [3] | [3] | [3] |
| Percent $CaCN_2$ in slurry that combines with starch | 0.0 | 29.8 | 36.3 | 39.8 | 43.1 |
| Mls. 0.5% starch solution retained completely by 100 mls. 1% Solkafloc after mixing 5 min | 0.0 | 2.5 | 2.0 | 1.5 | 1.0 |
| Percent crude $CaCN_2$ combined with starch | | 21.5 | 27.6 | 34.0 | 38.6 |

| Product | 88.00 | 88.20 | 88.10 | 88.05 | 88.03 |
|---|---|---|---|---|---|
| Reaction data: | | | | | |
| Mls. water | 0.0 | 5,000 | 5,000 | 5,000 | 5,000 |
| Grams crude $CaCN_2$ | 0.0 | 810 | 405 | 202.5 | 121.5 |
| Mls. filtrate | 0.0 | 4,520 | 4,770 | 4,940 | 4,860 |
| Moles $CaCN_2$ extracted | 0.0 | 3.9 | 2.34 | 1.36 | 0.93 |
| Moles $CaCN_2$ in crude $CaCN_2$ | 0.0 | 6.5 | 3.25 | 1.62 | 0.97 |
| Extraction efficiency, percent | 0.0 | 60.0 | 72.0 | 84.0 | 96.0 |
| Grams dry starch | 0.0 | 4,050 | 4,050 | 4,050 | 4,050 |
| pH slurry | 0.0 | 11.0 | 10.8 | 10.7 | 10.6 |
| Product data: | | | | | |
| Moisture, percent | 10.6 | 7.8 | 9.9 | 7.6 | 7.6 |
| Nitrogen, percent dry basis | 0.05 | 1.01 | 0.61 | 0.44 | 0.23 |
| Moles $N_2$/100 AGU | [1]0.3 | 5.8 | 3.6 | 2.6 | 1.4 |
| Alkaline fluidity | 88.0 | 88.0 | 87.0 | 88.0 | 88.0 |
| CIV, percent starch dry | 23.0 | 23.0 | 23.0 | 23.0 | 23.0 |
| Initial temp. of gelatinization °C | 75.0 | 49.0 | 63.0 | 70.0 | 73.0 |
| Temp. at peak viscosity | 79.0 | 67.0 | 73.0 | 75.0 | 77.0 |
| Peak viscosity, gm.-cm | 75 | 320 | 300 | 240 | 140 |
| Viscosity after 20 minutes | 10 | 0 | 20 | 15 | 10 |
| pH slurry/paste | 5.0/5.4 | 4.3/5.8 | 5.0/6.4 | 6.2/6.9 | 4.7/6.3 |
| Paste after 24 hours at 78° F | [2] | [3] | [3] | [3] | [3] |
| Percent $CaCN_2$ in slurry that combines with starch | 0.0 | 37.1 | 38.4 | 47.7 | 37.6 |
| Mls. 0.5% starch solution retained completely by 100 mls. 1% Solkafloc after mixing 5 min | 0 | 4.0 | 2.5 | 1.5 | 1.0 |
| Percent crude $CaCN_2$ combined with starch | | 22.2 | 27.7 | 40.0 | 36.0 |

[1] No nitrogen added.   [2] Stiffgel.   [3] Fluid.

EXAMPLE 7

1,000 grams calcium cyanamide, powdered and unoiled, were slurried with 5,000 mls. $H_2O$ at 100° F. for 30 minutes. The slurry was filtered and the filtrate introduced into a starch slurry containing 50 moles, 8,100 grams dry substance starch. 4,545 mls. filtrate were added containing, by Kjeldahl analysis, 5.77 mole equivalents calcium cyanamide or 11.5 moles per 100 moles starch (100 AGU). The starch slurry Baumé was 19.4 at 100° F.

After 16 hours at 100° F. no calcium cyanamide was detectable with alkaline $AgNO_3$ which gives a yellow precipitate in its presence. The pH was adjusted to 2.0 for 1 hour with HCl to form the cationic hydrochloride. The pH was then adjusted to 5.0 and the product filtered, washed and dried to 10% moisture. Nitrogen content by Kjeldahl analysis was 3.6 moles $N_2$/100 AGU. Cationicity by electrolysis of cooked 2% dispersion was positive, the starch collecting at the negative pole.

Tests on the Corn Industries Viscosimeter with both the treated and untreated starches gave the following results:

| Product | Treated | Untreated |
|---|---|---|
| Concentration grams/1,000 grams dispersion | 18 | 54 |
| Initial temperature of gelatinization °C | 74 | 86 |
| Temperature at peak viscosity °C | 83 | 90 |
| Peak viscosity, gram centimeters | 600 | 100 |
| Viscosity after 20 minutes, gm.-cm | 340 | 100 |

EXAMPLE 8

750 gram $CaCN_2$ were slurried with 5,000 mls. water for 30 minutes at 100° F. The slurry was filtered and diluted to 5,000 mls. The pH was 11.9 and the $CaCN_2$ content by Kjeldahl analysis 4.3 moles. 4,540 g., 25 moles, unmodified granular corn starch containing 10% moisture were slurried into this solution. The Baumé was 23.8 at 80° F. and the volume of slurry was 8,110 mls. The slurry pH was 10.9.

After 6 hours at 80° F. the slurry began to thicken. The pH was lowered to 2.0 with HCl and held for 1 hour, then adjusted to 5.0. The product was filtered, washed, dried to 10% moisture. The product analyzed 6 moles $N_2$ per 100 moles AGU. The fiber and electrolysis tests were both positive for cationicity.

A viscosity test on the Corn Industries Viscometer at a concentration of 18 grams 10% moisture material slurried in 982 mls. water at the standard bath temperature of 92° C. gave the following values:

Concentration, grams/1,000 grams dispersion ____ 18
Initial temperature of gelatinization, °C _____ 65
Temperature at peak viscosity, °C _____ 78
Peak viscosity, gram centimeters _____ 1,640
Viscosity after 20 min. g.-cm _____ 1,000
Viscosity after 40 min. g.-cm _____ 400

EXAMPLE 9

This example illustrates that even at nitrogen substitutions as low as 0.75 mole $N_2$/100 AGU, the hydrochloride salt, for example, is characterized by reduced gelatinization temperature, increased viscosity and reduced set-back as compared with the untreated starch.

45.4 g. crude $CaCN_2$ was slurried in 2,500 mls. water for 30 minutes at 100° F. The filtrate, containing 0.36 mole equivalent cyanamide, 2,480 mls., was poured into a 25 mole slurry of unmodified starch. pH of the slurry was 10.2. After 16 hours at 78° F. the pH was lowered to 2.0 with HCl for 1 hour, then adjusted to 5.0. The product was filtered, washed, dried to 10% moisture and tested on the CIV. The properties are tabulated in the following table: [1]

Concentration, grams/1,000 grams dispersion _____ 54
Initial temperature of gelatinization °C _____ 84
Temperature at peak viscosity, °C _____ 89
Peak viscosity, gram-centimeters _____ 360
Viscosity after 20 minutes _____ 340
pH slurry _____ 4.8
pH cooked paste _____ 6.8
Moles $N_2$ per 100 AGU's _____ 0.75
Cooked paste at 78° F. after 24 hours unstirred ___ Fluid

EXAMPLE 10

A 25 mole slurry of a thinboil with an alkali tip of 57 was prepared by slurrying 4,540 grams of the starch dried to a 10% moisture content in 5 liters of water.

136 grams crude $CaCN_2$ were slurried in 2,500 mls. water for 30 minutes at 78° F. The slurry yielded 2,365

[1] See Example 7 for properties of the untreated starch.

mls. filtrate, which contained .94 mole equivalent $CaCN_2$ by Kjeldahl analysis. This was poured into the starch slurry. pH of slurry=10.6.

After 7 hours at 78° F., the pH was lowered to 2.0 with HCl and held for 1 hour. Then, the pH was adjusted to 5.0, the slurry filtered, washed, reslurried; pH adjusted to 5.0; the slurry filtered and dried to 10% moisture.

The properties are recorded in the table below. The untreated thinboil is included for comparison.

| | Treated 57 thinboil | Regular 57 thinboil |
|---|---|---|
| CIV concentration: grams/1,000 grams dispersion | 99 | 99 |
| Initial temperature of gelatinization, ° C | 68.5 | 73.5 |
| Temperature at peak viscosity, ° C | 73.0 | 84.0 |
| Peak viscosity gram-centimeters | 840 | 150 |
| Viscosity after twenty minutes | 125 | 100 |
| Moles $N_2$ 100 AGU | 1.3 | 0.0 |
| pH slurry | 4.1 | 5.9 |
| pH cooked paste | 6.0 | 6.4 |
| Paste after 24 hours at 78° F | Fluid | Stiff gel |
| Cationicity | + | |
| Alkali tip | 54.5 | 57 |

EXAMPLE 11

These tests compare the properties of different cationic acid salts prepared from starch nitrogenated with calcium cyanamide.

500 grams of crude $CaCN_2$ were extracted 30 min. at 100° F. and the slurry filtered. There were 2.9 mole equivalents calcium cyanamide in 2,320 ml. of filtrate. 4,500 grams of unmodified corn starch containing 10% moisture was slurried therein. pH of the slurry was 11.3.

One liter was adjusted to pH 2.0 for one hour with nitric acid, then adjusted to pH 5.0 with soda ash, filtered, washed and dried to 10% moisture. This was labelled 1-$HNO_3$.

One liter was adjusted to pH 3.3 for one hour with glacial acetic acid (the pH would go no lower), then adjusted to 5.0 with soda ash, filtered, washed and dried to 10% moisture. This was labelled 1-Acetic.

One liter was adjusted to pH 2.0 with HCl, as above, and labelled 1-HCl.

One liter was adjusted to pH 2.0 with $H_3PO_4$, treated as above, and labelled 1-$H_3PO_4$.

One liter was adjusted to pH 2.0 with $H_2SO_4$, treated as above, and labelled 1-$H_2SO_4$.

| Product | 1-HCl | 1-$HNO_3$ | 1-$H_3PO_4$ | 1-acetic | 1-$H_2SO_4$ |
|---|---|---|---|---|---|
| CIV, percent starch dry basis | 1.5 | 1.5 | 1.5 | 1.5 | 5.0 |
| Initial gelatinization temp., ° C | 73 | 73 | >92 | >92 | 78 |
| Temp. at peak viscosity, ° C | 84 | 81.5 | | | 86 |
| Peak viscosity, gm.-cm | 700 | 370 | | | 65 |
| Viscosity at 20 min., gm.-cm | 300 | 160 | | | 65 |
| Nitrogen, percent dry basis | 0.64 | 0.64 | 0.76 | 0.64 | 1.18 |

EXAMPLE 12

The tests summarized here illustrate the influence of pH on the cyanamide reaction.

Cyanamide solution was prepared by slurrying 405 grams powdered calcium cyanamide in 5 liters $H_2O$ for 30 minutes at 78° F. The slurry was filtered and the filter cake washed with 1 liter $H_2O$, which was combined with the filtrate. The pH was adjusted to 5.0 with cool 40% sulfuric acid and the calcium sulfate filtered off. One liter of filtrate contained 0.549 mole equivalents cyanamide.

Each of the products tabulated below was prepared by slurrying 900 grams (5 moles) unmodified corn starch in 1 liter filtrate. Except for product 1, pH of the starch-cyanamide slurry was adjusted as shown with dilute NaOH. After 16 hours' reaction time at 78° F., the pH of all of the slurries was reduced to 2.0 with HCl for 1 hour and then raised to 5.0 with sodium carbonate solution. The products was filtered, washed, dried, and analyzed for nitrogen content by Kjeldahl.

The reaction efficiency is the ratio of the number of moles $N_2$ (moles equivalent cyanamide) combined with 100 moles starch (AGU) to the number of moles cyanamide per 100 moles starch (AGU) in the reaction slurry.

| Product | 1 | 2 | 3 | 4 | 5 | 6 | 7 |
|---|---|---|---|---|---|---|---|
| Moisture, percent | 10.0 | 10.3 | 10.4 | 10.1 | 10.7 | 11.1 | 10.0 |
| Ash percent dry basis | 0.14 | 0.10 | 0.05 | 0.03 | 0.02 | 0.03 | 0.02 |
| Nitrogen, percent dry basis | 0.07 | 0.11 | 0.16 | 0.19 | 0.33 | 0.48 | 0.48 |
| Reaction pH | 5.0 | 8.5 | 9.0 | 9.5 | 10.0 | 10.5 | 11.0 |
| Reaction efficiency | 0.0 | 5.8 | 8.3 | 10.0 | 17.3 | 40.0 | 40.0 |

It will be noted that there is no appreciable reaction until about pH 8.5 and that the optimum pH is about 10 to 10.5 and above.

EXAMPLE 13

Cationicity and substantivity of the nitrogenated starch hydrochloride as compared with the untreated starch is demonstrated by the following tests.

10 grams hospital cotton in a liter beaker is wet with 400 mls. distilled water. 5 mls. of a 1% cooked starch product dispersion, cooled to room temperature, is added and the mixture stirred vigorously for 1 minute. After 15 minutes of standing a small portion of the supernate is carefully decanted and checked for starch with a drop of 0.01 N Iodine. If negative for starch, 5 mls. more of the 1% starch dispersion is added with 1 minute vigorous stirring and 15 minutes' standing to allow the fine fibers to separate before testing again for starch. The following table gives the number mls. 1% starch that may be added until the supernate tests positive for starch.

| Product | Moles $N_2$/ 100 AGU added | Mls. 1% starch dispersion |
|---|---|---|
| A | 5.9 | 50 |
| B | 4.2 | 95 |
| C | 2.2 | 80 |
| D | 1.5 | 40 |
| Untreated | 0.0 | <5 |

We have found that starch can be successfully nitrogenated by our process even in the presence of the gluten proteins as illustrated by Examples 14 and 15.

EXAMPLE 14

To 5 liters of a starch gluten slurry, 20 Bé., 78° F., were added 250 grams crude, powdered, calcium cyanamide. pH of the slurry was 11.2. After 16 hrs. at 78° F., the slurry was tabled to separate the gluten; the starch was reslurried; and the pH taken to 2.0 with HCl for 1 hour, then to pH 5.0, filtered, washed, and dried to 10% moisture.

Color_____ Light grey.
Nitrogen_____ 0.53% dry basis.

| CIV | Treated | Regular |
|---|---|---|
| Concentration: grams/1,000 grams dispersion | 54 | 54 |
| Initial temperature of gelatinization ° C | 64 | 87 |
| Temperature at peak viscosity ° C | 68 | 90 |
| Peak viscosity gram-centimeters | 2,220 | 160 |
| Viscosity after 20 minutes | 520 | 160 |
| Paste after 24 hours at 78° F | Fluid | Stiff gel |

EXAMPLE 15

250 grams calcium cyanamide were slurried in 2,500 mls. water for 30 minutes at 78° F. There were 2,345 mls. of filtrate which contained 1.72 mole equivalents calcium cyanamide.

Starch gluten cake was slurried in this filtrate to 20 Bé. at 78° F. pH of the slurry was 10.2. After 16 hours at 78° F., the slurry was tabled to separate the starch from the gluten. The starch was reslurried; the pH adjusted to 2.0 with HCl for 1 hour, then to 5.0, filtered, washed, dried to 10% moisture.

[Nitrogen 0.79% dry basis]

| CIV | Treated | Regular |
|---|---|---|
| Concentration: grams/1,000 grams dispersion | 36 | 54 |
| Initial temperature of gelatinization ° C | 78 | 87 |
| Temperature at peak viscosity° C | 84 | 90 |
| Peak viscosity gram-centimeters | 350 | 160 |
| Viscosity after 20 minutes | 200 | 160 |
| Paste after 24 hours at 78° F | Fluid | Stiff gel |
| Cationicity | + | − |
| Color | White | White |

Nitrogenated thinboil starches are most conveniently prepared by starting with starch that has already been modified or thinboiled to the desired alkaline fluidity, as illustrated in a number of the previous examples. A nitrogenated thinboil starch product can, however, be made from an unmodified or regular starch nitrogenated according to our process, if the maximum degree of nitrogen substitution is about 1.5 moles $N_2/100$ AGU. In making the thinboil, the regular or unmodified starch is treated with the aqueous alkaline cyanamide as aforedescribed; then acidified, as, for example, with HCl, preferably to a pH below 2.0, preferably about 1.0 to 1.5; held at this pH at a temperature of about 125 to 130° F. for several hours until the desired alkaline fluidity is reached; adjusted to pH 4.5 to 5.0; filtered; washed; and dried. Starches having higher degrees of substitution than about 1.5 moles $N_2/100$ AGU tend to repolymerize during drying to give alkaline fluidities approximating those of unmodified starches.

EXAMPLE 16

136 grams, 0.3 lb., crude calcium cyanamide, were slurried at 100° F. for 30 minutes in 2,500 mls. water and filtered. There were 2,400 mls. filtrate which had a Baumé of 2.0 at 91° F. and a pH of 11.6.

The filtrate was poured into a 25 mole aqueous slurry, 4,050 grams dry substance starch. After adding the filtrate the pH of the slurry was 10.3 volume 11,750 mls., 16.5 Baumé, 78° F.

After 16 hours at 78° F., the pH was reduced to 1 with HCl. The temperature was elevated to about 125 to 128° F. and maintained at this temperature until the alkaline fluidity of the starch was about 64. The slurry was then neutralized to pH 5.0, washed and reslurried. The pH was adjusted to 5.0 and held there for 1 hour. The product was filtered and dried to 10% moisture.

The properties are recorded in the table below. A regular 64 thinboil is included for comparison.

| CIV | Treated 64 Thinboil | Regular 64 Thinboil |
|---|---|---|
| Concentration: grams/1,000 grams dispersion | 117 | 117 |
| Initial temperature of gelatinization ° C | 67.0 | 72.5 |
| Temperature at peak viscosity, ° C | 71.5 | 77.0 |
| Peak viscosity, gram-centimeters | 800 | 190 |
| Viscosity after twenty minutes, gm.-cm | 75 | 70 |
| Viscosity after forty minutes, gm.-cm | 55 | 50 |
| Moles $N_2$ 100 AGU | 1.5 | 0.0 |
| Test for cationicity | Positive | Negative |
| Alkali tip | 64 | 64 |
| pH slurry | 4.2 | 5.1 |
| pH cooked paste | 4.9 | 5.6 |
| Paste after 24 hours at 78 °F | Fluid | Stiff gel |

EXAMPLE 17

405 grams of calcium cyanamide were slurried in 5000 mls. water for 30 minutes at 78° F., then filtered. There were 4900 mls. filtrate containing 2.82 moles calcium cyanamide. 25 moles (10 lbs.) of granular corn starch, having a nitrogen content of 0.07%, were slurried into the filtrate. The mixture had a pH of 10.9. 1000 grams of ice were added and the slurry held at 32.5° F. At the intervals indicated in the table below, a portion of the slurry was removed and adjusted to pH 3.7 with HCl. The granules were filtered, washed, dried, and analyzed for nitrogen content.

| Hours treated | 16 | 18 | 40 | 64 | 88 | 112 | 136 | 184 | 232 |
|---|---|---|---|---|---|---|---|---|---|
| Nitrogen, percent dry basis | 0.50 | 0.52 | 0.65 | 0.67 | 0.75 | 0.78 | 0.79 | 0.81 | 0.84 |

EXAMPLE 18

One liter of the starch-cyanamide slurry of Example 17 was frozen for 88 hours. It was then allowed to thaw and adjusted to pH 3.7 with HCl. The granules were filtered, washed and dried. Nitrogen content was 0.60%.

The preparation of nitrogenated gelatinized starches and other polymeric hydrophilic colloids is disclosed and claimed in our copending application Serial No. 786,926, filed January 15, 1959, and the preparation of nitrogenated high amylose starches having an amylose content of at least 50% is disclosed and claimed in our copending application Serial No. 827,715, filed July 17, 1959.

Although this invention has been described with reference to illustrative embodiments thereof, it will be apparent to those skilled in the art that the principles of the invention can be embodied in other forms within the scope of the appended claims.

We claim:

1. A product from the class consisting of a nitrogenated granular starch product obtained by reacting granular ungelatinized starch at a temperature below the gelatinization temperature of said starch with a substance from the group consisting of cyanamide, and alkali metal and alkaline earth metal salts of cyanamide, in an aqueous alkaline solution having a pH of at least about 8.5, and acid addition products of said nitrogenated granular starch product.

2. A hydrochloric acid addition product of a nitrogenated granular starch product obtained by reacting a granular ungelatinized starch at a temperature below the gelatinization temperature of said starch with a substance from the group consisting of cyanamide and alkali metal and alkaline earth metal salts of cyanamide, in an aqueous alkaline solution having a pH of at least about 8.5, and thereafter acidifying with hydrochloric acid to a pH below 4.0.

3. A nitric acid addition product of a nitrogenated granular starch product obtained by reacting a granular ungelatinized starch at a temperature below the gelatinization temperature of said starch with a substance from the group consisting of cyanamide and alkali metal and alkaline earth metal salts of cyanamide, in an aqueous alkaline solution having a pH of at least about 8.5, and thereafter acidifying with nitric acid to a pH below 4.0.

4. A sulfuric acid addition product of a nitrogenated granular starch product obtained by reacting a granular ungelatinized starch at a temperature below the gelatinization temperature of said starch with a substance from the group consisting of cyanamide and alkali metal and alkaline earth metal salts of cyanamide, in an aqueous alkaline solution having a pH of at least about 8.5, and thereafter acidifying with sulfuric acid to a pH below 4.0.

References Cited in the file of this patent

UNITED STATES PATENTS

| 2,538,903 | Gaver et al. | Jan. 23, 1951 |
| 2,894,944 | Paschall | July 14, 1959 |

FOREIGN PATENTS

| 508,977 | Canada | Jan. 11, 1955 |